(No Model.)

J. T. CLARKSON.
CARRIAGE.

No. 466,773.                    Patented Jan. 12, 1892.

Witnesses
Clara L. Power.
N. W. Green

Inventor
Joseph T. Clarkson
per T. W. Porter, Atty.

UNITED STATES PATENT OFFICE.

JOSEPH T. CLARKSON, OF AMESBURY, MASSACHUSETTS.

CARRIAGE.

SPECIFICATION forming part of Letters Patent No. 466,773, dated January 12, 1892.

Application filed January 14, 1891. Serial No. 377,711. (No model.)

*To all whom it may concern:*

Be it known that I, JOSEPH T. CLARKSON, of Amesbury, in the county of Essex and State of Massachusetts, have invented a new and useful Improvement in Carriages, which will, in connection with the accompanying drawings, be hereinafter fully described, and specifically defined in the appended claims.

Figure 1:
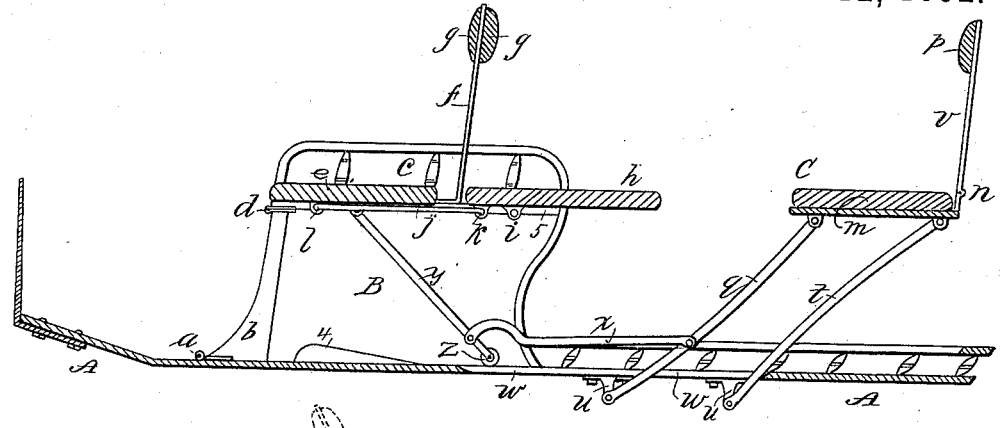
Figure 2:
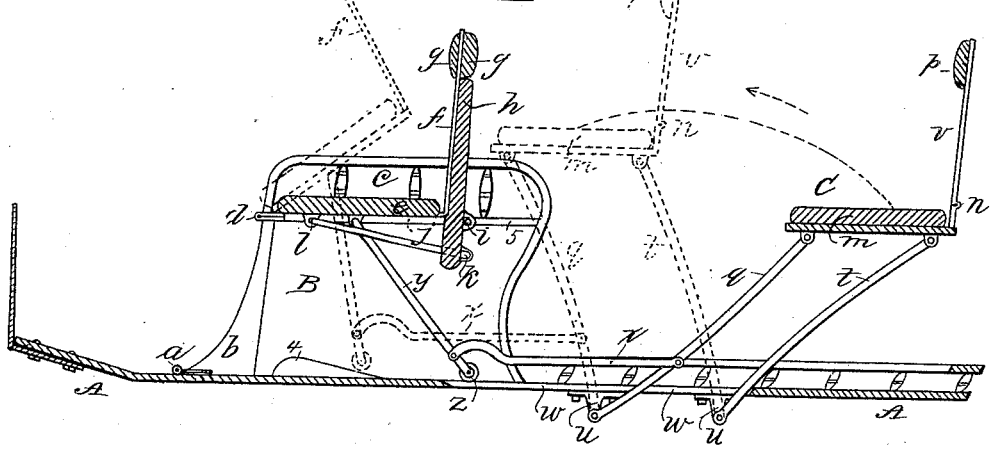
Figure 3:
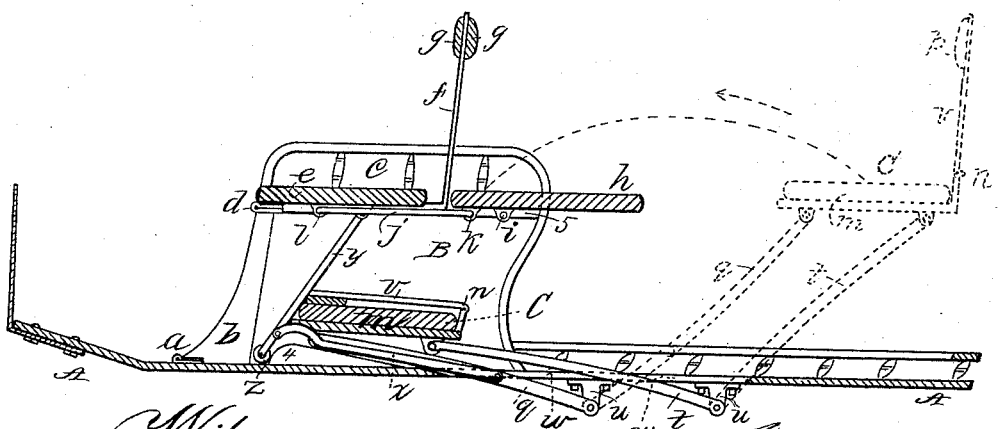

In said drawings, Figure 1 is a sectional elevation of a carriage body and seats embodying my invention, the section being vertical and longitudinal and the view from the left-hand side of the body, the three seats being shown as when all are arranged for use. Fig. 2 is a view similar to Fig. 1, but with the parts arranged as when the front and rear seats are in position for use. Fig. 3 is a similar view, but shows the rear seat turned down and the front and middle seats in position for use.

My invention relates to what are known as "adjustable-seat carriages;" and its object is to enable the user to convert his vehicle at will into a one, two, or three seat carriage in an expeditious manner, according as he desires to carry more or less persons therein; and it consists in features of novelty and the combinations thereof, as will be next herein described in connection with the accompanying drawings.

Referring again in detail to said drawings, A represents the body as of the "buckboard" class, but which may be varied in style, as preferred. The front-seat base is shown at B, which may be hinged to A, as at $a$, at the front edge of pillar $b$ of said base. The seat "side" or "end," as it is indifferently termed, is shown at $c$, and the seat-bottom at $e$, as resting upon the sills 5 of end $c$, which may be either secured rigidly to base B, or it may be hinged thereto, as at $d$, so as to tilt upon the hinge-pivot, as will be explained. Standards $f$ are secured rigidly to seat $e$, and to their upper portion the double-facing lazy-backs $g$ are secured. A convertible middle seat or back $h$ is pivoted at $i$ to said sill 5, and is pivotally connected with front seat $e$ by connector $j$, pivoted at $k$ in $h$ and at $l$ in $e$, and which moves seat $e$ rearward to a limited extent when $h$ is raised to coact with $g$ in forming a full-width back for seat $e$ and returns it to its forward position when $h$ is turned down to serve as a middle or rear seat. The position of seat $h$ when turned up to serve as part of the back of seat $e$ is shown in Fig. 2, and in Fig. 3 it is shown as when turned down to serve as a middle or rear seat. A rear turn-down seat is shown at $m$ and as supported upon the front jumping-irons $q$ and the rear jumping-irons $t$, each of which is pivotally supported in a hanger $u$, projecting downward from the floor of body A, a slot $w$ being cut in the floor at each side of the body to allow the requisite action of irons $q$ $t$ in jumping the seat. As seat $m$ could not be jumped forward and turned down, as shown in Fig. 3, unless the front and middle seats were tilted forward to the requisite extent, I have invented the following-described devices whereby to so automatically tilt them as the rear seat moves forward. A connector $x$ is at its rear end pivoted to jumping-iron $q$ at the proper distance above its pivot in hanger $u$, the front end of said connector being pivoted to a strut $y$, which at its upper end is pivoted to seat $e$ at a proper distance in rear of its hinge $d$, while in its lower end is pivoted a truck $z$, which travels along an incline or cam 4, duly arranged upon the floor for that purpose and in order to tilt the front seat, so as to allow the rear seat to pass beneath it.

Instead of pivoting the front seat at $d$, the base B thereof may be pivoted to the body, as at $a$, as above stated, the devices for automatically tilting the seat operating equally well in either case.

It will be obvious that the devices for jumping the rear seat, as well as those by which the front seat is automatically tilted, are in the usual and well-known manner duplicated at each side of the body. By arranging the hangers $u$ $u$ below the body important advantages are gained, as with the seat at a given height above the floor, when raised, a greater scope of jumping movement can be given the seat than when the irons $q$ $t$ are pivoted above the floor in the usual manner, besides which greater lateral support for the seat is obtained, as the distance from the pivots in the hangers to the floor is in effect a leverage tending to prevent lateral swaying of the seat. It will be seen that when the seats are arranged as shown Fig. 1 there are three seats, the front and rear ones facing forward, while the middle seat $h$ faces to the rear. When arranged as in Fig. 2, there are two seats, the front and rear ones each facing forward, the middle seat $h$ being turned up beneath $g$ to give the front a full and entire back, while in Fig. 3 there are two seats, the rear one $m$ being jumped forward beneath the front one and seat $h$ being turned down to serve as a rearward-facing seat, and in such case to constitute a single-seated carriage it would be only requisite to turn up seat $h$, as in Fig. 2, when seat $e$ would be the sole seat. A lazy-back $p$, supported by irons $v$, pivoted at $n$ to short standards on seat $m$, is turned down when the seat is jumped beneath the front seat, as shown in Fig. 3.

I claim as my invention—

1. In a jump-seat carriage, the jumping-irons extended below the floor of the body and pivoted in hangers depending from the body, substantially as specified.

2. The combination, with a pivoted front seat, of a rear jump-seat connected with and arranged to tilt said front seat to allow the rear seat to pass beneath it as the rear seat is jumped forward, substantially as specified.

3. The combination of rear jumping-seat $m$, the connector $x$, attached to a jumping-iron of said seat, the strut $y$, pivotally attached to the hinged seat $e$ and to said connector, and a suitable cam arranged in the path of the truck in the lower end of said strut, all substantially as specified.

4. The combination of front seat $e$, arranged to be moved forward and back upon its supports, seat $h$, pivoted in rear of seat $e$ and arranged to be turned up to coact with back $g$ as a back for seat $e$, and connector $j$, connected with said seats to actuate seat $e$ when $h$ is turned up or down, substantially as specified.

JOSEPH T. CLARKSON.

Witnesses:
  WM. T. CLARKSON,
  GEORGE H. BRIGGS.